Feb. 11, 1941.  J. MIHALYI  2,231,731
DOUBLE EXPOSURE PREVENTION DEVICE
Original Filed Sept. 9, 1933  5 Sheets-Sheet 1

Joseph Mihalyi
INVENTOR
BY
ATTORNEYS

Feb. 11, 1941.          J. MIHALYI                    2,231,731
             DOUBLE EXPOSURE PREVENTION DEVICE
          Original Filed Sept. 9, 1938      5 Sheets-Sheet 2
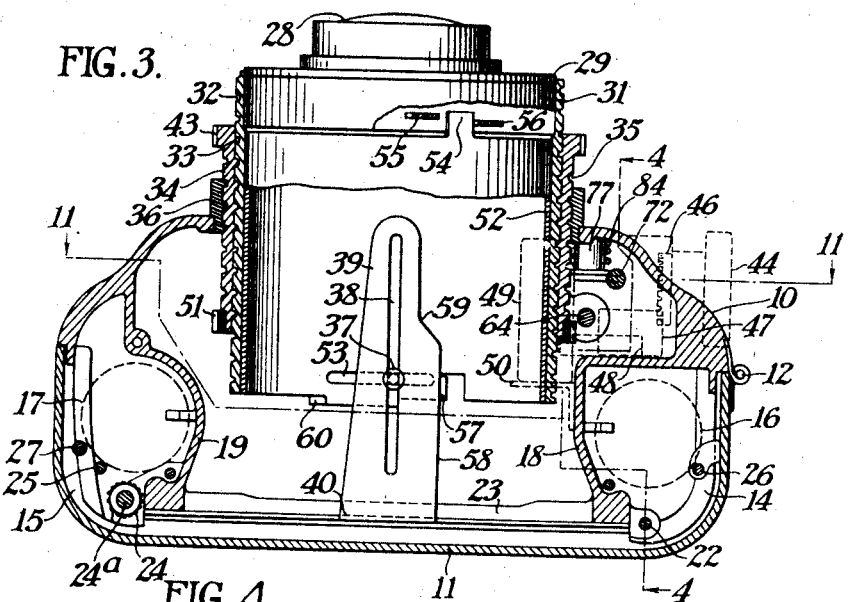
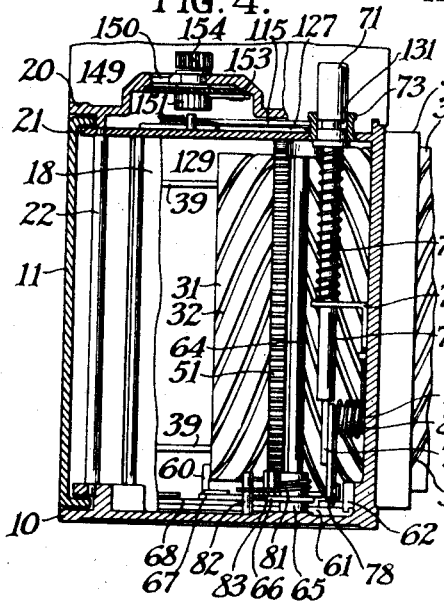
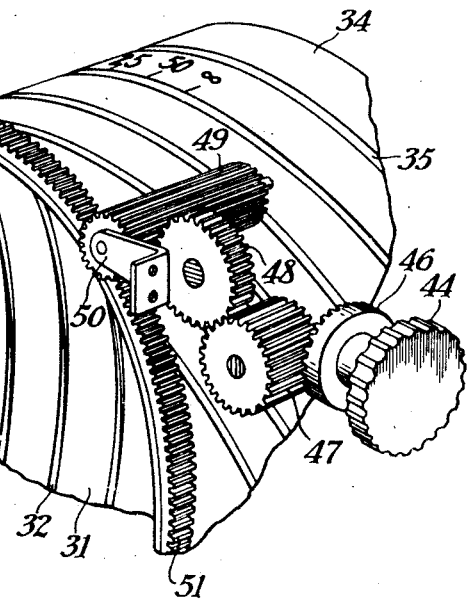
Joseph Mihalyi
INVENTOR
BY
ATTORNEYS Feb. 11, 1941.   J. MIHALYI   2,231,731
DOUBLE EXPOSURE PREVENTION DEVICE
Original Filed Sept. 9, 1938   5 Sheets-Sheet 3
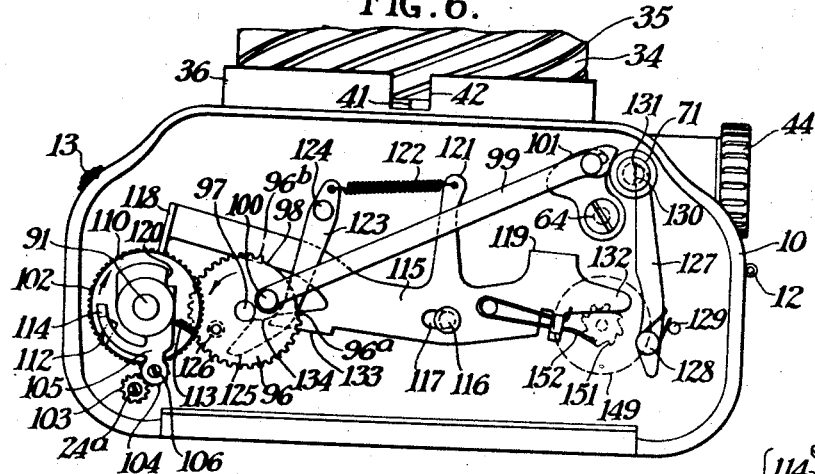
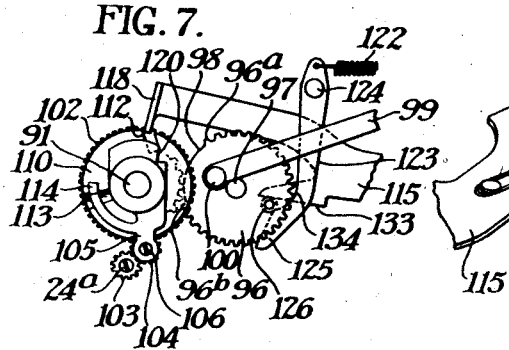
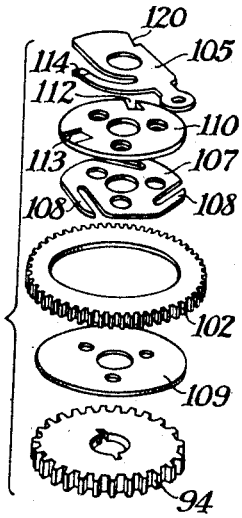
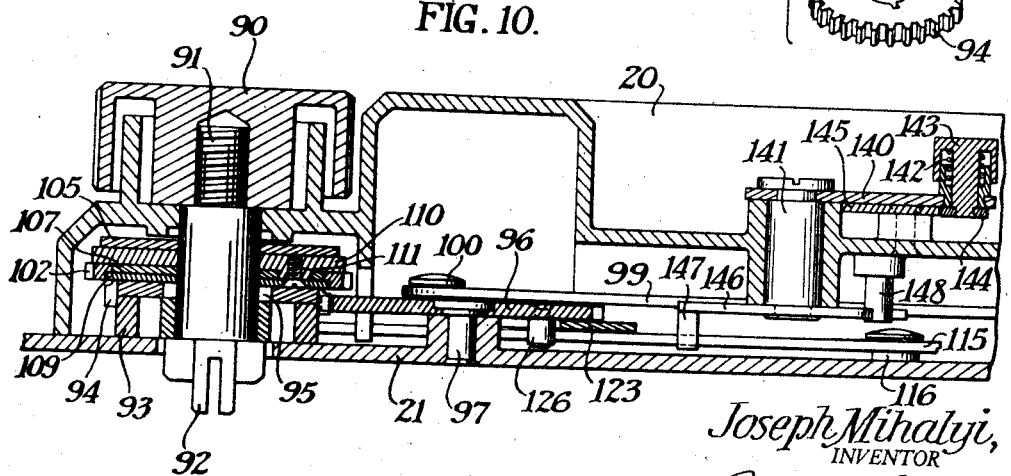
Joseph Mihalyi,
INVENTOR
BY
ATTORNEYS

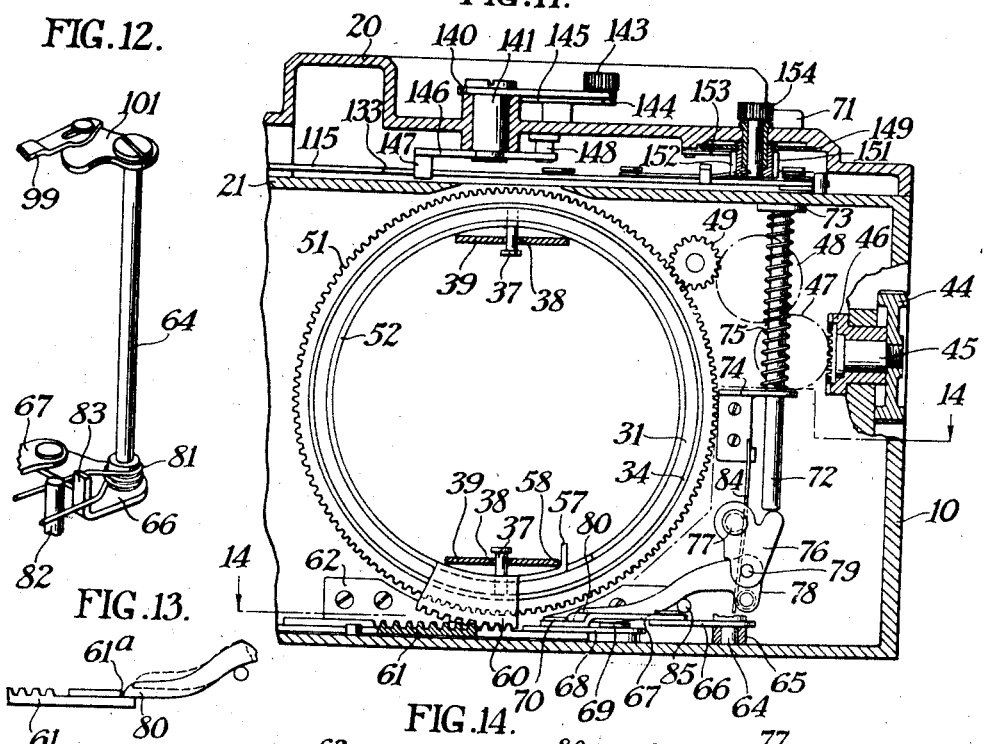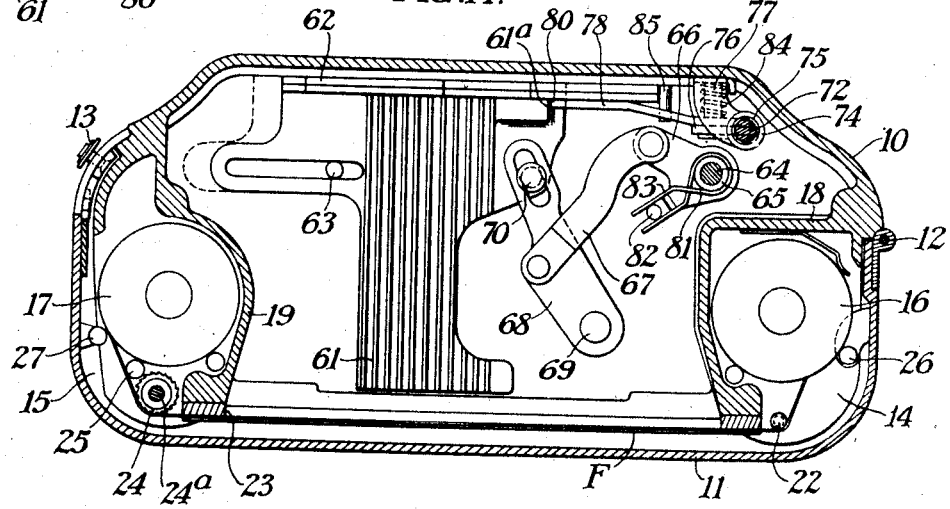

Feb. 11, 1941.                J. MIHALYI                2,231,731
                    DOUBLE EXPOSURE PREVENTION DEVICE
                   Original Filed Sept. 9, 1938    5 Sheets-Sheet 5
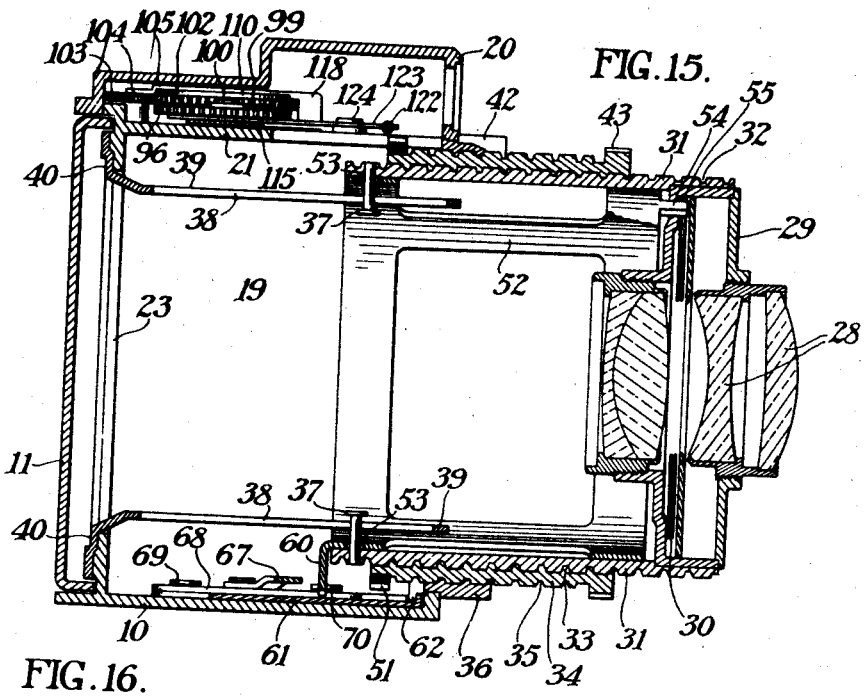
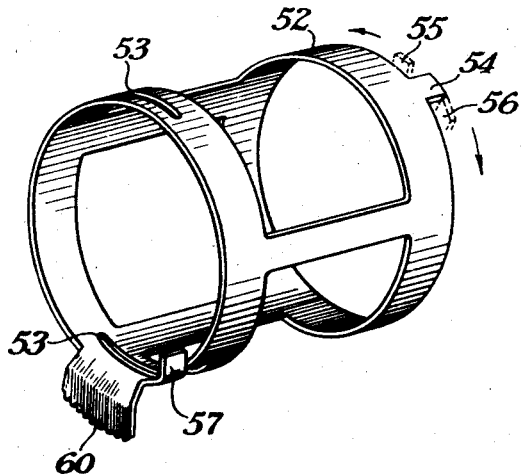
Joseph Mihalyi,
INVENTOR
BY
ATTORNEYS Patented Feb. 11, 1941

2,231,731

UNITED STATES PATENT OFFICE 2,231,731

DOUBLE EXPOSURE PREVENTION DEVICE

Joseph Mihalyi, Rochester, N. Y., assignor to Eastman Kodak Company, Rochester, N. Y., a corporation of New Jersey Original application September 9, 1938, Serial No. 229,151. Divided and this application July 6, 1939, Serial No. 283,017

13 Claims. (Cl. 95—31)

This invention relates to photography, and more particularly to a roll film camera having a shutter and a film winding device cooperating therewith to prevent the improper operation of the camera.

One object of my invention is to provide a camera in which a shutter of the setting type is employed, and to provide connections between the setting shutter and the film winding mechanism to require the proper operation of both of these camera parts in timed relation. Another object of my invention is to provide a camera of the type described, in which an oscillatable and slidable connection is made between shutter parts and film winding parts to insure the proper operation of these parts in the proper timed relation. Another object of my invention is to provide a camera with a shutter enclosed in a telescoping tubular camera front, and to provide connections inside the telescoping tubular front between the shutter and the film winding mechanism. Still another object of my invention is to provide a camera with a telescoping tubular front enclosing a between-the-lens type of shutter, anad to provide connections between the relatively fixed camera body and the telescoping tubular member which may connect the film winding mechanism with the shutter, and other objects will appear from the following specification, the novel features being particularly pointed out in the claims at the end thereof.

This is a division of my copending application Serial No. 229,151, filed September 9, 1938.

Coming now to the drawings wherein like reference characters denote like parts throughout:

Fig. 3 is a plan in section, showing the lens-tube construction;

Fig. 4 is a sectional fragmentary elevation on line 4—4 of Fig. 3;

Fig. 5 is a fragmentary view in perspective showing the focusing mechanism;

Fig. 6 is a view similar to Fig. 1, with the parts in the position they will assume after the shutter has been released;

Fig. 7 is a plan view showing a portion of the film winding mechanism near the completion of its cycle;

Fig. 8 is a perspective view of the exposure counter operating parts;

Fig. 9 is an "exploded" perspective view of some of the parts shown in Fig. 7;

Fig. 10 is a vertical section parallel with the focal plane, taken approximately at the center line of the film spools;

Fig. 11 is a vertical section, enlarged, on line 11—11 of Fig. 3, showing the rear end of the lens tube and the parts connected with the shutter release;

Fig. 12 is a perspective view of parts of the interlocking mechanism;

Fig. 13 is a fragmentary elevation of a portion of the shutter-operating mechanism;

Fig. 14 is a plan in section, on line 14—14 of Fig. 11;

Fig. 15 is a vertical central section on the optical axis of the camera, looking toward the left in Fig. 11; and Fig. 16 is a perspective view of the shutter operating tube.

Figure 1:
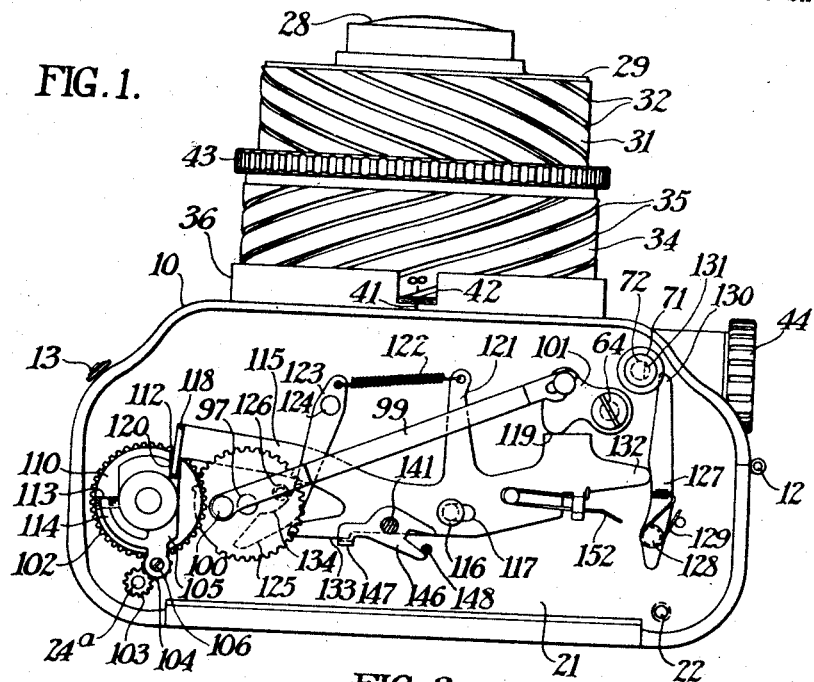
Fig. 1 is a top plan of a camera constructed in accordance with this invention, a part of the upper casing being removed to show some of the interlocking mechanism between the film wind and the shutter release, and the shutter being set for exposure.
Figure 2:
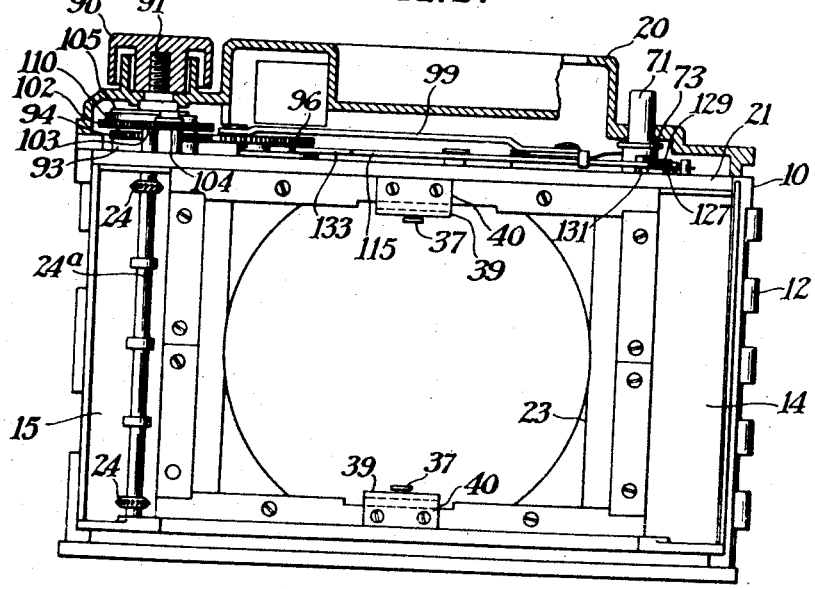
Fig. 2 is a rear elevation, partly in section, with the camera back removed.

In some of the figures of the drawings some parts have been omitted for the sake of clearness. However, these parts are shown in some of the figures.

The camera as illustrated herewith has neither bellows nor folding bed member, but is of the type in which a retractile tube carries both the lens and the shutter, so that these parts may be withdrawn partially within the camera body to reduce the overall dimensions and extended or projected forwardly for focusing. The body 10 of the camera may be molded, or cast, and is provided with a back 11, hinged at 12, and having a latch 13. The back 11 forms a closure for film chambers 14 and 15 for film supply and receiving spools 16 and 17 respectively, while walls 18 and 19 complete these chambers and separate them from the interior of the body proper.

A separate compartment or housing 20 may be attached to the top wall 21 of the camera to contain and cover some of the interlocking parts previously mentioned, and may also support and enclose the range-finder elements, the view finder, and other accessories. As some of these form no part of the present invention they are omitted from the drawings and need not be further described.

The film F is drawn from supply spool 16 over an idler roll 22 and across the exposure aperture frame 23, a ratchet-toothed pair of rolls 24, and another idler 25, to the receiving spool 17.

Both spools are preferably guided while in place by rollers 26 and 27 on the back 11.

The lens elements 28 are shown as mounted in a conventional manner in the casing 29 of a between-the-lens shutter designated generally by the numeral 30. The shutter 30 is preferably of the "setting" type, wherein a movement of a part or projecting arm in one direction (circumferentially) sets the shutter for operation, and the movement of another projecting arm in the opposite circumferential direction releases the shutter to make an exposure.

The shutter 30 is mounted in the outer end of a tube 31, on the exterior of which are cut multiple threads 32. These threads are adapted to follow and engage similar threads 33 in the inner wall of a larger tube 34, the latter also having exterior threads 35 that work in an interiorly-threaded collar 36, fixed in the front wall of the camera. The threads 32 and 35 are of opposite hand, in the present instance left-hand and right-hand respectively, so that a maximum of linear movement of the tubes may be had for a given amount of rotation, for the purpose of focusing the lens elements on the film F at the exposure aperture 23, and also to retract the tubes into the camera.

To accomplish the above-described results, the outer tube 34 is revoluble in the threaded collar 36, so that a left-hand rotation of the tube 34 (as viewed in Fig. 1) retracts it, and a right-hand rotation moves it outwardly from the camera. The inner tube 31 is held against rotation by pins 37 that project through slots 38 in stationary brackets 39. These latter are supported at 40 on the aperture frame at the rear wall of the camera. The above arrangement results in the tube 31 having axial movement only and because of the opposite threads the lens 28 moves twice as far along the optical axis for a given rotary movement of the tube 34 as it would if only one tube were used. In consequence, the focusing scale numerals S may be placed closely together on the tube 34 (Fig. 1). An index mark 41 is provided in a notch 42 in the collar 36 so that most of the numerals on the scale except the one in the notch are obscured by the collar, thereby reducing the chance of the operator making an error in reading the scale.

The tube 34 may be rotated for focusing by grasping the knurled rim 43. A more accurate and controlled movement is obtained by turning an external knob 44 at the right side of the camera. The shaft 45 of this knob carries within the camera a crown-type gear 46 that meshes with a pinion 47, and the latter in turn through a pinion 48 rotates a long pinion 49, supported in brackets 50. The pinion 49 meshes with a ring gear 51 on the inner end of tube 34 and thus rotates the latter as the knob 45 is turned by the operator. The length of the pinion 49 is such that the ring gear 51 is always meshed therewith regardless of the linear or rotative position of the tube 34.

Within the tube 31 is a plain tube 52, "skeletonized" as in Fig. 16, which may be designated as the shutter operator. Oppositely-disposed circumferential slots 53 in this tube coact with the pins 37 that are fixed in the tube 34. The tube 52 therefore is capable of partial rotation within the tube 34, but must move forward and backward with the latter during the focusing adjustment.

A lug 54 on the shutter operator extends beyond the front end thereof and is so located that when the shutter operator 52 is rotated to the left (Fig. 3) the lug will strike the setting lever 55 on the shutter 30 and will set or cock the shutter. When the tube 52 is rotated to the right (clockwise in Fig. 11) the lug 54 will strike the release lever 56 of the shutter and the latter is thus tripped to make an exposure. If the focusing tube 31 has not been carried forward to at least the "infinity" position the shutter cannot be tripped because a lug 57 on the rear edge of the shutter operator tube 52 engages a widened portion 58 on the lower bracket 39. When lug 57 passes the shoulder 59 the lens has reached "infinity" position and then the tube 52 may be rotated clockwise to trip the shutter. Mechanism for rotating tube 52 in either direction will now be described.

At the rear end of tube 52, and formed downwardly therefrom is a segmental gear 60 meshing with a rack 61. The latter is slidable in ways 62 and on a guide pin 63 transversely along the bottom wall of the camera and is of such a length that it is always meshed with the segmental gear 60 regardless of the position of either of the tubes 31 or 52. Obviously therefore, if rack 61 is moved toward the right, tube 52 will be rotated counterclockwise (as viewed from the rear) and if the rack is moved to the left the tube 52 will be rotated clockwise. These movements respectively set and trip the shutter as previously described.

The means for moving the rack to the right for setting the shutter is interconnected with the mechanism for advancing the film. Only the portions directly affecting the rack will now be described. A shaft 64, adapted to oscillate in bearings 65 on the upper and lower walls of the camera, carries a bellcrank 66, one arm of which is connected through a link 67 with a lever 68, pivoted at 69. Lever 68 has a pin-and-slot connection 70 with rack 61. If the shaft 64 is rotated clockwise (Fig. 14) the rack will be pulled to the right, and by reason of gear 60 being meshed therewith, the tube 52 will be rotated counterclockwise to set the shutter by contacting and moving the arm 55 as before described.

The rack 61 is moved to the left, and the tube 52 accordingly rotated clockwise to release the shutter, by means of the finger release 71. This release extends to a rod 72, guided for vertical movement in a bearing 73 and a bracket 74. A spring 75 tends to elevate the rod 72 and the finger release 71 to the normal position. Pressure on the release 71 moves rod 72 downwardly and swings a bellcrank 76, pivoted at 77, and this movement carries a second bellcrank, 78, pivoted to 76 at 79, toward the left, until the toe 80 (Fig. 13) of the long arm of bellcrank 78 engages a shoulder 61a on rack 61 and carries the latter also toward the left and so rotates the tube 52 to trip the shutter, as before described.

From either the set or released position, the rack 61 and therefore the tube 52 are returned to normal by the action of a spring 81, coiled around the hub of bellcrank 66. The ends of spring 81 press against opposite sides of a pin 82 and a lug 83 is turned up from one arm of bellcrank 66 between these spring ends. As the spring 81 is comparatively stiff, its ends react to center the lug 83 between them whichever way the lug is moved, and thus return the rack 61 and tube 52 to "neutral."

It should be noted that a spring 84, wound about the pivot 77 (Fig. 11) is anchored against bracket 74 and its free end urges bellcrank 78 in a counterclockwise direction about its pivot 79, so that the toe 80 is positively pressed into engagement with the shoulder 61a. A fixed pin 85 limits the downward movement of toe 80 and also causes the latter to rise clear of shoulder 61a as indicated by broken lines in Fig. 13, when the finger release 71 is permitted to move upwardly.

The film advancing mechanism and interlocking parts which prevent double exposure, will be best understood by reference to Figs. 1, 6, 7, 8, 9 and 10. A winding knob 90 on a stub shaft 91 that carries a spool key 92 on its inner end is used in the conventional manner to wind the film F onto the receiving spool 17. The usual roller clutch 93, not detailed, prevents the knob from turning in the reverse direction.

Above the clutch 93 (Fig. 10) is a gear 94 that is fixed to the shaft 91 by a key 95. This gear is adapted to mesh with a gear 96, pivoted at 97. Some of the teeth of gear 96 are removed, leaving a smooth portion 98 for a purpose presently to be described. A pitman 99 is attached to gear 96 at 100 and its opposite end has a slot-and-pin connection with a crank arm 101, fixed on the upper end of vertical shaft 64 above the top wall 21 of the camera body.

As the winding knob 90 is turned, the gear 96 is rotated from the position indicated in Fig. 1 to that indicated in Fig. 6, and the pitman 99 swings arm 101 toward the rear of the camera and rotates shaft 64 to move rack 61 to set the shutter as previously described.

Again referring to Figs. 9 and 10, above the gear 96 is a ring gear 102. This gear is adapted to be driven by the film F itself when the winding knob 90 is turned, by reason of the emulsion side of the film engaging the toothed or serrated rollers 24. These latter dig into the emulsion just enough so that they will be turned, even against considerable resistance, as the film rolls over them. At the top of the shaft 24a that carries rolls 24 is a pinion 103, meshing with an idler pinion 104, which in turn meshes with gear 102. Idler pinion 104 is supported in a flat plate or yoke 105, a stud 106 serving both as a pivot for the pinion and an anchor for the plate.

Within the gear 102 is a friction member 107 having a series of outwardly-sprung tongues 108 that frictionally engage the inner periphery of the gear 102. Member 107 is retained between a disc 109 that enters a rabbet in the gear 102, and a second disc 110 by means of screws 111. These three elements (the two discs and the gear 102) are free to revolve on the stub shaft 91 when driven by pinions 103 and 104.

In the edge of disc 110 is a notch 112 and in its top face is a stop shoulder 113. The latter is adapted to engage the end of a tongue 114 on yoke 105 and to be held thereby against counterclockwise movement. The tongue 114 is sufficiently resilient to permit the disc 110 to revolve clockwise under it and then to snap back of shoulder 113 when the latter reaches the position of Fig. 1.

Means are provided, as previously mentioned, whereby the film cannot be advanced until the finger release has been depressed to operate the shutter and make an exposure, whereupon the finger release cannot again be depressed until the film has been advanced one "frame." This condition is brought about through the movement of a lever 115, which may be designated the interlock, which is pivoted at 116 on the top wall of the camera body 10 and is provided with a slot 117 for limited lateral movement. An upstanding lug 118 is adapted to engage the notch 112 in disc 110 and may also drop behind a shoulder 120 on the yoke 105 if moved far enough to the right. An arm 121 projects forwardly from the interlock 115 and is connected through a spring 122 with a lever 123 pivoted at 124. This lever has a hooked end 125 underlying gear 96 and in the same plane as a pin 126 that projects downwardly from said gear. On the front of lever 115 is forwardly projecting edge 119 that is adapted to be engaged by the rear of arm 101.

Near the right side of the camera top wall 21 is a lever 127 pivoted at 128 and urged counterclockwise by a spring 129. When the finger release 70 is depressed the spring 129 forces the forward end 130 of lever 127 into a notch 131 (Fig. 4) in the finger release 70, so that the latter is locked against further movement until the lever 127 is moved in the opposite direction. This movement will occur when interlock 115 is moved a sufficient distance to the right to cause its end 132 to strike lever 127 and move the portion 130 clear of the notch 131 in part 70 (Fig. 1).

The above description makes clear the construction and arrangement of the novel features which are designed to prevent double exposure. The operation and movements of these members are set forth in the succeeding paragraphs.

Assuming that the parts are in the relation shown in Fig. 1, wherein the shutter is set for an exposure and the film has been advanced, if the operator presses finger release 70, the bellcranks 76 and 78 will be moved, the toe 80 will engage shoulder 61a, rack 61 will move to the left, segmental gear 60 will turn tube 52 clockwise, and the lug 54 will push shutter release lever 56 to the right and the shutter will be tripped to make an exposure. Simultaneously, the movement of rack 61 turns shaft 65 counterclockwise (Fig. 14) through the action of link 67 and lever 68, so that arm 101 is swung rearwardly. As this arm is already in contact at 119 with interlock 115, the latter will be swung about its pivot 116 and the lug 118 will be moved forwardly away from shoulder 120 on yoke 105. Spring 122 then carries the interlock to the left as far as permitted by slot 117. Lug 118 then rides on the smooth periphery of disc 110 (Fig. 6) but this disc cannot turn backwardly because of tongue 114 which is engaged in shoulder 113. Interlock 115 thus being moved to the left permits spring 129 to swing lever 127 and move its end 130 into notch 131 in finger release 70 as soon as the operator removes his finger and permits the release to rise. The latter cannot then be depressed again until lever-end 130 has been moved out of notch 131, and until a new frame of film has been advanced to the exposure aperture 23.

The operator now turns the knob 90 clockwise. Gear 94 engages the first tooth 96a of mutilated gear 96 (starting from the position of Fig. 1) and turns this gear, carrying pitman 99 and arm 101 to the position of Fig. 6. This movement turns shaft 64 clockwise, and through link 67 and lever 68 carries rack 61 to the right, causing tube 52 to rotate to the left. Lug 54 then strikes the setting lever 55 and sets the shutter for another exposure.

As the operator continues to wind knob 90 to frame a new area of film, the film in passing onto spool 17 engages the toothed rollers 24, as previously described and so rotates pinions 103 and 104 which carry gear 102 in the same direction as the knob 90. It should be clearly understood that there is no positive connection between the knob 90 and the gear 102, the latter being driven only by the film F. Disc 110, being frictionally and not positively driven through the spring action of clutch member 107 is carried around with gear 102 until the left side of the notch 112, contacts lug 118 (Fig. 7).

Before the notch 112 engages the lug 118 the mutilated gear 96 has been rotated to a position where the last tooth 96b thereof passes out of mesh with gear 94, and that the latter may then continue its rotation without further affecting gear 96. This permits a full frame of film to be "wound on." At this time pin 126 abuts a prong 133 on interlock 115 and thus gear 96 is stopped, the parts then being in the relative positions indicated in Fig. 7. Continued movement of the film (by turning knob 90) causes the side of notch 112 to push interlock 115 far enough to the right so that spring 112 forces lug 118 back toward yoke 105 and it is then latched at shoulder 120 and cannot again move to the free position. During this last slight movement of the interlock, the prong 133 passes off from pin 126, and as the flat end 125 of lever 123 is pressing against the pin 126 just at the point where said flat terminates, the curved portion 134 of lever 123 under the action of spring 122 acts in the nature of a cam and pushes the pin 125 forwardly, thus rotating gear 96 so that the untoothed portion 98 thereof freely passes gear 94 and the first tooth 96a engages a tooth on gear 94 and comes to rest, ready for another cycle of operations.

If now the number of the next film frame has not appeared in the observation window of the camera back 11 (not shown) the operator may continue to wind film and the film will still turn gear 102, the disc 110 however cannot rotate because it is then blocked by the lug 118 (Fig. 1) so the friction disc 107 will slip on the inner surface of gear 102 as long as may be necessary to complete the winding of the film to the next frame.

The last fraction of an inch of movement of interlock 115 to engage lug 118 behind shoulder 120 causes the end 132 to push lever 127 to the right, thus freeing or unlocking finger release 70 for the next exposure.

From the above it will be noted that the operator cannot trip the shutter until after he has wound most of the next film frame onto the receiving spool. After starting to wind he will of course continue until the next number appears in the observation window. As the winding of the film sets the shutter, the camera is then ready for the next exposure without any further thought or action. When the next exposure is made, the shutter cannot be tripped again until more film is wound onto the receiving spool. Double or blank exposures are thus rendered impossible, as the film cannot be advanced from one frame to another until the shutter has been tripped.

When the operator inserts a fresh supply spool of film and starts to wind it onto the receiving spool, a much greater length than one frame must be wound before the numeral 1 appears in the observation window. It is therefore, necessary to render the interlock inoperative until the first frame is in position. To this end, a lever 140 is pivoted on the top of housing 20 at 141. A spring 142 tends to raise a knob 143 and to engage a washer 144 below the lever with a notched latch plate 145. By depressing this knob the washer is released from the latch plate and the lever 140 may be moved forwardly or back. When moved toward the back, a forked arm 146 at the bottom of pivot 141 is swung so that a lug 147 on said arm strikes the rear edge of prong 133 on the interlock 115 and forces the latter forward, removing lug 118 from notch 112 and permitting the operator to wind on the required amount of film to bring the first of the group of numerals "1" on the backing paper into the observation window. Then if the operator depresses knob 143 again and moves arm 140 forwardly, the lug 147 is withdrawn from prong 133 and the lug 118 may snap back into notch 112 under the pull of spring 122 as soon as winding knob 90 is given another quarter-turn. This last movement will carry the film the necessary distance to correctly place No. 1 frame, and the camera is then ready for the first exposure.

An exposure counter is also incorporated in the structure as illustrated herewith, and may comprise a numbered disc 149 (Fig. 11) the figures on which may be read through a window 150 in the housing 20. A ratchet 151 under disc 149 is turned the space of one tooth (or one digit on disc 149) by a pawl 152 (Fig. 8) mounted on the interlock 115. This pawl is indicated as made of a piece of spring wire, suitably formed to function as both a pawl and a spring, one end being turned up to engage the teeth of ratchet 151. A holding pawl 153 may be arranged to prevent reverse rotation of disc 149 and a knob 154 is provided for manual setting of the counter.

What I claim is:

1. In a camera, the combination with a camera body, of a focusing lens mount, a shutter including a setting lever and a release lever carried thereby, means inside the focusing lens mount movably mounted therein for setting the shutter and tripping the shutter when moved in different directions, a trigger mounted on the camera body, a film winding device mounted on the camera body, and means including a slidable connection for moving said movably mounted member in a direction to set the shutter including gearing on the camera body, means for intermittently engaging the gearing on the camera body and the slidable connection, connecting members between said gearing and said slidable connection for moving the latter by the former, and means operable by the film winding device for moving said gearing when said gearing is engaged.

2. In a camera, the combination with a camera body, of a focusing lens mount, a shutter including a setting lever and a release lever carried thereby, means inside the focusing lens mount movably mounted therein for setting the shutter and tripping the shutter when moved in different directions, a trigger mounted on the camera body, a film winding device mounted on the camera body, and means for moving said movably mounted member in a direction to set the shutter including gearing on the camera body, a slidable connection between the gearing and the movable means inside the focusing lens mount for connecting these parts, means for intermittently engaging the gearing and connecting members between said gearing and said movably mounted member for moving the latter by the former, and separate connections between the trigger and said movable member for actuating the movable member in an opposite direction for tripping the shutter.

3. In a camera, the combination with a camera body, of a focusing mount, an objective and shutter carried thereby, a release lever for the shutter, a setting lever for the shutter, a film winding device, a member movably mounted inside the focusing mount to move in two directions for setting and tripping the shutter and including a post, slidable connections between the movably mounted member and the post, bearings for supporting said post, and means for retaining said post in a normal position of rest whereby said member may be held between its setting and tripping positions.

4. In a camera, the combination with a camera body, of a movably mounted focusing mount, an objective and shutter carried thereby, a release lever for the shutter, a setting lever for the shutter, a film winding device on the camera body, a member mounted to move in two directions inside of the focusing mount for setting and tripping the shutter, a post carried by the camera body, slidable connections between the member and post, bearings for supporting said post, and means for retaining said post in a normal position of rest whereby said member is held between its setting and tripping positions comprising a spring having two arms, a lug normally engaging both arms, a spring arm being adapted to be placed under compression by moving said post toward its shutter setting or shutter tripping positions.

5. In a camera, the combination with a camera body, of a movably mounted focusing mount, an objective and shutter carried thereby, a release lever for the shutter, a setting lever for the shutter, a film winding device carried by the camera body, a member mounted on the movable focusing mount to move in two directions for setting and tripping the shutter, a post carried by the camera body and movable connections between said member and the post, bearings for supporting said post, and means for retaining said post in a normal position of rest whereby said member is held between its setting and tripping positions comprising a spring having two arms, a lug normally engaging both arms, a spring arm being adapted to be placed under compression by moving said post toward its shutter setting or shutter tripping positions, and means including gearing interconnected to the film wind device for moving the post to set the shutter.

6. In a camera, the combination with a camera body, of a movably mounted focusing mount, an objective and shutter carried thereby, a release lever for the shutter, a setting lever for the shutter, a film winding device on the camera body, a member mounted inside the focusing mount to move in two directions for setting and tripping the shutter, a post carried by the camera body and connections thereto including a pair of relatively slidable interconnected elements, bearings for supporting said post, and means for retaining said post in a normal position of rest whereby said member may be held between its setting and tripping positions comprising a spring having two arms, a lug normally engaging both arms, a spring arm being adapted to be placed under compression by moving said post toward its shutter setting or shutter tripping positions, and means including gearing interconnected to the film wind device for moving the post to set the shutter, a trigger member carried by the camera body, and connections between the trigger and movable member through said relatively slidable connected element for moving the latter to a shutter tripping position, whereby said post may place a spring arm under tension to return said post to a normal position after an exposure.

7. In a photographic roll-film camera, the combination with a camera body, of a lens, a shutter provided with setting and release members, and film advancing mechanism, the combination of a movable lens mount revoluble about the lens axis within the body for focusing, an operating member for the shutter attached to the movable lens mount and movable laterally of the lens mount axis and independently thereof, means actuated by the film-advancing mechanism for moving the operating member in one direction to set the shutter, manually-actuated means for moving the operating member in another direction to release the shutter, and interlocking mechanism between said manually-actuated means whereby one cannot be operated until the other has performed its function.

8. In a photographic roll-film camera the combination with a body, of a lens, a shutter provided with setting and release members, and film advancing mechanism carried by the camera body, the combination of a lens mount revoluble within the body for focusing, a tubular member movably mounted within the lens mount and independently movable in one direction for setting the shutter and in the opposite direction for releasing the shutter, mechanism adapted to be rotated by the film when the latter is being advanced and arranged to rotate the tubular member to set the shutter, manually-operable means connected to the tubular member and adapted to rotate the latter to release the shutter, and interlocking mechanism between the film advancing mechanism and the manually-operable means whereby neither can be operated until the other has performed its function.

9. In a photographih roll-film camera the combination with a camera body, of a lens, a shutter carrying the lens and provided with a setting member and a release member, a manually-operated release control carried by the camera body, and film advancing mechanism carried by the camera body, the combination of a lens mount comprising concentric threaded movably mounted tubes, one of said tubes being revoluble in the body and the other non-revoluble; a shutter-operating member movably mounted in one of the tubes to move transversely of the tube; connections between the shutter-operating member and the film advancing mechanism, whereby movement of the latter rotates the shutter-operating member in one direction; connections between the manually-operated release control on the camera body and the movably mounted member carried by the movable focusing tube whereby movement of said control rotates the shutter-operating mechanism in another direction; and interlocking means between the film-advancing mechanism and the manually-operated release control, adapted to prevent the latter from being operated until the film has been advanced a predetermined amount.

10. A photographic roll-film camera having, in combination, a camera body, a film-advancing mechanism carried thereby, a lens, a shutter carrying the lens, a lens-mount comprising a pair of movable concentric tubes, one revoluble and one non-revoluble, both of said tubes being movable axially for focusing the lens; a shutter-operating member movably mounted and carried by within one of said tubes and arranged to be moved in one direction by movement of the film-advancing mechanism to set the shutter; a manually operated release member carried by the camera body and connected with the shutter-operating member to move the latter in another direction to release the shutter; and mechanism driven by the film and movable therewith said mechanism being arranged so that the manually-operated release member is rendered inoperative until the film has been advanced a predetermined amount thereby, through the mechanism driven by the film, whereby the movement of the film may set the shutter.

11. In a roll-film camera the combination with a shutter and a manual release therefor, of a film-advancing mechanism including a winding key, double-exposure prevention means comprising, in combination, serrated rolls in contact with the film and adapted to be rotated by said film when the latter is advanced; a revoluble stop member, a friction drive connection between said serrated rolls and said stop member; a shutter trigger carried by the camera body; a latch for controlling the shutter trigger, and a lever between said latch and said film advancing mechanism adapted to be moved by the latter to disengage said latch when the film is advanced.

12. In a roll-film camera the combination with a shutter and a manual release therefor, of a film-advancing mechanism, double-exposure prevention means comprising, in combination, serrated rolls in contact with the film and adapted to be rotated by said film when the latter is advanced; a revoluble stop member, a friction drive connection between said serrated rolls and said stop member; a latch for said manual release and interlocking mechanism adapted to be moved by said stop member to disengage said latch when the film has been advanced, said interlocking mechanism also being so arranged that a subsequent movement of the manual shutter release to make an exposure causes the interlocking mechanism to engage said latch and to be disengaged from said stop member.

13. A roll-film camera having a body, film-advancing mechanism, a lens, and a shutter carrying the lens and provided with a setting member and a release member, a movable tubular mount for said lens and said shutter comprising a tube revoluble in the body and a second tube and movable axially by the rotation of the revoluble tube, a shutter-operating member of tubular form within said tubular mount movably mounted closely adjacent the inner walls of the tubular mount, and means for moving said shutter-operating member in one direction adjacent the tubular mount wall to contact the setting member and another direction to contact the release member, said shutter-operating member also being movable axially with the axially-movable tube.

JOSEPH MIHALYI.